United States Patent

Paulus et al.

[11] Patent Number: 6,042,924
[45] Date of Patent: Mar. 28, 2000

[54] LAMINATED GLASS PANE WITH FUNCTIONAL FILM

[75] Inventors: Peter Paulus, Muenster; Gerwin Jung, Herdecke; Detlef Baranski, Recklinghausen, all of Germany

[73] Assignee: Flachglas Automotive GmbH, Witten, Germany

[21] Appl. No.: 09/092,795

[22] Filed: Jun. 5, 1998

[30] Foreign Application Priority Data

Jun. 6, 1997 [DE] Germany .................... 19723701

[51] Int. Cl.⁷ .................. B32B 3/00; B32B 3/02; B32B 3/10; B32B 17/00
[52] U.S. Cl. .................. 428/77; 428/60; 428/78; 428/81; 428/131; 428/137; 428/138; 428/192; 428/201; 428/203; 428/210; 428/426
[58] Field of Search .................. 428/60, 77, 78, 428/81, 131, 137, 138, 192, 201, 203, 426, 430; 296/84.1, 96.19

[56] References Cited

U.S. PATENT DOCUMENTS 4,799,745  1/1989  Meyer et al. ............... 350/1.7
5,208,080  5/1993  Gajewski et al. ............ 428/1

*Primary Examiner*—Vivian Chen
*Attorney, Agent, or Firm*—Marshall & Melhorn

[57] ABSTRACT

A laminated glass pane with a transparent functional film embedded between laminating layers, said functional film incorporating a recess, wherein in the area of the recess of the functional film is arranged a transparent auxiliary film whose thickness is essentially the same as the thickness of the functional film. To prevent faults in optical transmission in the area of the recess, the auxiliary film overlaps the edge of the recess at least slightly in some areas.

7 Claims, 1 Drawing Sheet

LAMINATED GLASS PANE WITH FUNCTIONAL FILM

BACKGROUND OF THE INVENTION

1. Field of the Invention

The invention concerns a laminated glass pane with a transparent functional film embedded between laminating layers, which incorporates a recess, where in the area of the recess of the functional film is arranged a transparent auxiliary film, whose thickness corresponds essentially to the thickness of the functional film. The invention concerns in particular laminated safety glass pane of the aforementioned construction.

Recess in the functional film means within the scope of the invention an opening completely bounded by the gfunctional film within the surface of the functional film, as well as open cutouts in the edge area of the functional film extending towards the edge. The invention includes in particular such laminated glass panes where the edge of the functional film is, at least in some areas, set back from the edge of the laminated glass pane, where the film-free edge area so formed forms the said recess.

Laminated glass panes consist of at least one rigid pane of inorganic or organic glass which, in the case of laminated safety glass panes is bonded to plastic layers imparting safety properties, and is generally bonded to at least one other glass pane. Between the various layers of the laminated glass panes are arranged laminating layers whose function is to join the layers adhesively to one another. The laminating layers impart the required safety properties, either through suitable material selection and thickness themselves, or establish the bond with separate layers of the laminate imparting the safety properties. In practice, films of polyvinylbutyral or ethylene/vinyl acetate copolymers are used for the laminating layers, their thickness being typically 0.38 mm or a multiple thereof.

2. Description of the Prior Art

Laminated glass panes of the aforementioned construction, in particular for vehicle applications, are increasingly being provided with additional functional films embedded between laminating layers, with the aid of which the laminated glass panes are intended to assume additional functions, such as for example solar control properties or heatability. Known functional films consist of thermoplastic substrate films, for example of biaxially stretched polyethylene terephthalate (PET) or similar materials, with a thickness of approximately 10–100 $\mu$m, which are coated with a thin-layer system (U.S. Pat. No. 4,799,745).

Normally, the functional films possess the same external dimensions as the other layers of the laminated glass pane and thus end at its edge. It is already known practice however to use functional films with a recess in the edge area for a variety of applications.

If one uses functional films with a recess as interlayer in laminated glass panes, this leads to thickness "stepping" occurring in the transition area from the recess to the functional foil—referred to below as edge of the recess—which, according to the thickness of the functional film, causes more of less disturbing optical distortion (lens effect).

U.S. Pat. No. 5,208,080 discloses a laminated glass pane of the generic construction, where the functional film possesses smaller dimensions than the individual glass panes, that is to say is provided with a surrounding recess in the edge area. In the area of the surrounding recess are arranged bordering on the edge of the recess auxiliary strips of thermoplastic material, preferably of the material of the laminating layers, abutting the functional film. In this way, it is intended to embed the functional film entirely in laminating layers. It has been found that, when employing this method, it is not possible to reliably prevent the inclusion of air bubbles between the edge of the recess and the auxiliary strips. In addition, disturbing optical distortion can occur in the area of the edge of the recess.

SUMMARY OF THE INVENTION

The invention is based on the technical problem of improving generic laminated glass panes such that optical distortion, such as for example lens effects, are to a large extent prevented in the area of the edge of the recess.

The solution according to the invention is the subject of claim 1. Preferred developments will be found in the subclaims.

Surprisingly, it is possible, by insertion of an auxiliary film of approximately the same thickness as that of the functional film in the area of the recess, to reduce optical faults effectively or prevent them entirely by the auxiliary film slightly overlapping the edge of the recess, at least in some areas.

A slight overlap in the sense of the invention is present particularly when the auxiliary film, viewed in vertical projection, ends a maximum of approximately 10 mm, preferably a maximum of 5 mm, behind the edge of the recess.

Of course, such an overlap of the auxiliary film is only necessary where the edge of the recess of the functional film is visible in installed state of the laminated glass pane. Especially good optical properties are achieved if the functional film and the auxiliary film are arranged on the same plane and thus directly overlap. It is also possible however to proceed such that the auxiliary film is arranged on a plane separated by a laminating layer from the plane of the functional film. In this case, it is possible to achieve a state where the functional film and the auxiliary film each border on both sides over their entire area on laminating films, so that optimum bonding properties are present over the entire pane surface.

In the event that the functional film is formed by a substrate film provided with a thin-layer system, the auxiliary film will preferably incorporate no coating, or if necessary, one differing from the thin-layer system of the substrate film. This solution is especially advantageous for example if the thin-layer system is electrically conductive and the recess in the functional film serves to keep the recessed area free of conductive coating. If the substrate film and the auxiliary film consist of the same material, satisfactory compatibility of the two films will be achieved in a simple fashion. The manufacture of a laminated glass pane will also be simplified when using identical or similar materials for the substrate film and the auxiliary film.

It lies within the scope of the invention to mask the area of the recess and thus also the area of the edge of the recess visually, additionally to the arrangement of the auxiliary film according to the invention, by providing in the laminated glass pane an area of reduced light transmission at least partially overlapping the recess. This can be effected for example by using a color-wedge film for one of the laminating layers, the color wedge being arranged such that it overlaps the recess and tapers off on the other side of the edge of the recess, above or underneath the functional film. Another option consists of suitable arrangement of masking layers printed or otherwise applied to one of the glass panes, such as for example dot matrixes.

Of course, the laminated glass pane according to the invention can incorporate more than one functional film. In the same way, several recesses can be provided in each of the functional films used.

BRIEF DESCRIPTION OF THE DRAWINGS

The invention is explained below with the aid of embodiments and Figures. These are shown, in each case, in sectional view.

DESCRIPTION OF THE PREFERRED EMBODIMENT

The laminated glass pane illustrated diagrammatically and not to scale in section perpendicular to the plane of the pane, which might be designed for use in motor vehicles as laminated safety glass window, incorporates two outer glass panes 1,2. The glass panes 1,2 can consist in known fashion of inorganic or organic glass or vitreous material, tinted in the mass, or coated wholly or partially with transparent or opaque materials. The glass panes 1,2 can be chemically or thermally (partially) toughened.

Between the glass panes 1,2 is located, embedded in laminating layers 5,6,7, a functional film 3 provided with a thin-layer system 8. The functional film 3 consists in the example illustrated of a 50 µm thick PET substrate film. As thin-layer system 8, is provided a solar control or low-E layer system based on silver layers and dielectric anti-reflective layers. The laminating layers 5,6,7 each consist of 0.38 mm thick PVB films.

Of course, the thickness of the functional film 3 and the number and thickness of the laminating layers 5,6,7 are variable within wide scope, according to requirements within the scope of the invention. The numerical values stated are only typical specimen values. It is advisable of course, for maximum reduction of undesirable optical distortion, to use laminating layers 5,6,7, whose overall thickness is significantly greater (at least by a factor of 5, preferably more than ten times) than the thickness of the functional film 3.

Figure 1:
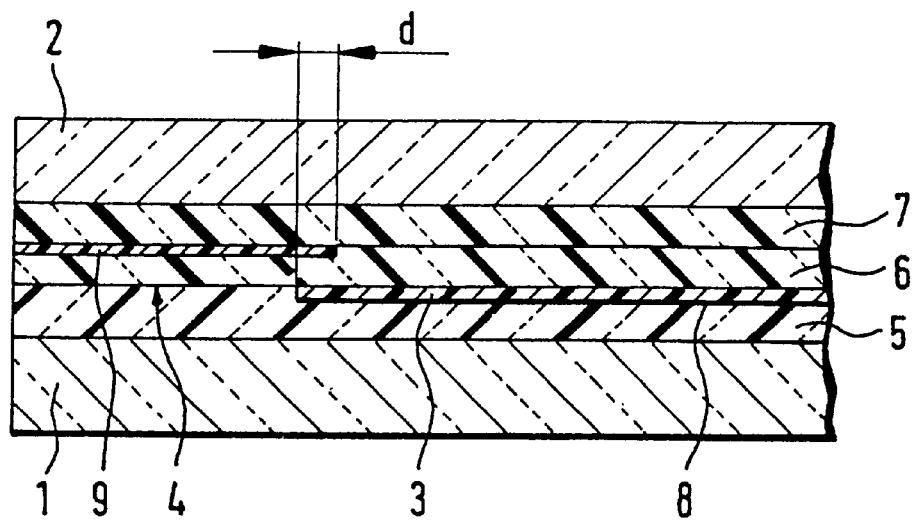
FIG. 1 is a first embodiment of the invention with functional film and auxiliary film arranged on different planes.

According to a first embodiment which is illustrated in FIG. 1, the functional film 3 possesses in the edge area of the laminated glass pane a recess 4, that is to say its edge is spaced from the edge of the laminated glass pane. The reason for this may consist of the fact that the thin-layer system 8 is prone to corrosion and that the spacing from the pane edge should be protected from contact with diffusing moisture. Another application can consist of the area of the recess 4, when the laminated glass pane is installed in the window cutout of a motor vehicle body, being connected as slot antenna, where if necessary additional antenna conductors, not illustrated, may be provided in the area of the recess 4 (EP 0 760 537 A2).

According to the invention, a transparent auxiliary film 9 of uncoated PET, also 50 µm thick, is inserted between the laminating layers 6 and 7 per FIG. 1, and thus on a different plane than the functional film 3. The dimensions of the auxiliary film 9 are chosen such that it extends from the pane edge to slightly past the edge of the recess, and thus in the projection, with the functional film 3, slightly overlaps perpendicular to the plane of the pane. In each case, the overlap area is denoted in the Figures by "d". The overlapping arrangement of the functional film 3 and auxiliary film 9 surprisingly has the effect that, particularly when viewed in transmission, only slight, hardly perceptible optical faults occur—this also being termed lens effect—in the area of the edge of the recess 4. Such faults are to be observed when the use of an auxiliary film 3 in the area of the recess 4 is entirely dispensed with or it is arranged on the plane of the functional film 3 and abuts it. For production reasons, the width "d" of the overlap area is designed to be at least 0.5 to 1 mm, greater overlap widths than approximately 10 mm will be optically disadvantageous.

The material and the thickness of the auxiliary film 9 are to be selected such that the auxiliary film 9 is compatible with the normal processes for production of laminated glass panes. The thickness of the auxiliary film 9 must be essentially the same as the thickness of the functional film 3, in order to prevent optically effective thickness differences of the laminated glass pane in the area of the functional film 3 and the auxiliary film 9. The auxiliary film 9 should preferably be uncoated. This is particularly true if the thin-layer system 8 is neutral in color in respect of transmission and reflection, as is frequently the case with the usual low-E and solar control layer systems. It can also be provided with a coating which imparts a special optical or other function in the area of the recess 4 (and the overlap area). Thus, it is possible for example, in the case of an electrically conductive thin-layer system 8 of the functional film 3, to provide the auxiliary film 9 with a non-conductive coating which produces visual matching to the functional film. Such an approximation of the visual properties can also be achieved by using suitably tinted material for the auxiliary film 9.

Figure 2:
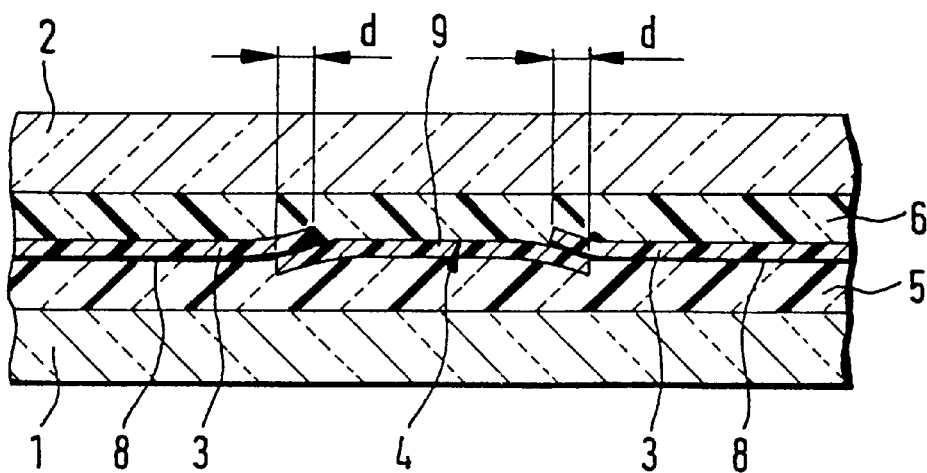
FIG. 2 is a second embodiment of the invention with functional film and auxiliary film located on the same plane.

In the second embodiment per FIG. 2, the laminated glass pane again incorporates two glass panes 1,2. Between them, embedded in two 0.38 mm thick PVB laminating layers 5,6, is arranged a functional film 3 of 70 µm thick PET with a thin-layer system 8, which this time possesses a recess 4 in the central area of the pane. The recess 4 may possess a circular, triangular, rectangular or other outline. It can serve to provide an area of permeability for electromagnetic radiation, the thin-layer system 8 of the functional film 3 not being sufficiently permeable. Another application can consist of dividing an electrically conductive thin-layer system 8 into two or more metallically separated areas, for example with different antenna functions, or into heatable and into unheated areas. In the area of the recess 4, is arranged a 65 µm thick uncoated, transparent auxiliary film 9 of polyester, which slightly overlaps the edge of the functional film 3 all-round. The width of the overlap area "d" is approximately 3 mm. Surprisingly, in this embodiment as well, no significant deterioration in the optical transmission properties occur in the area of the edge of the recess 4. Thus, measurements taken in laminated glass panes in accordance with the two embodiments revealed refractive powers in transmission in the area of the edge of the recess of significantly less than 15 mdpt. In comparison with this, laminated glass panes with functional films, where no auxiliary films had been arranged in the recess, evidenced lens effects with refractive powers of approximately 40 mdpt, while in a further reference example, where auxiliary films cut to match the recess had been inserted in the recess without overlapping the functional film, refractive powers of over 60 mdpt were in fact found.

It lies within the scope of the invention to provide further elements, not illustrated in the Figures, between the glass panes of the laminated glass pane, such as for example heating panels, antenna conductors, connecting cables, printed areas, thin-layer systems, etc. Of course, laminated glass panes according to the invention can possess more than one recess 4 in the functional film 3. Manufacture of the laminated glass pane can for example take place with processes which are known to the specialist from WO 97/10099 or U.S. Pat. No. 5,208,080.

We claim:

1. Laminated glass pane with a transparent functional film embedded between laminating layers, which incorporates a recess, where in the area of the recess of the functional film is arranged a transparent auxiliary film, whose thickness corresponds essentially to the thickness of the functional film, wherein at least in some areas, the auxiliary film overlaps the edge of the recess.

2. Laminated glass pane in accordance with claim 1, wherein the auxiliary film overlaps the edge of the recess by a maximum of 10 mm.

3. Laminated glass pane in accordance with claim 1, wherein the auxiliary film is located on the same plane as the functional film.

4. Laminated glass pane in accordance with claim 1, wherein the auxiliary film is arranged on a plane separated from the plane of the functional film by a laminating layer.

5. Laminated glass pane in accordance with claim 1, with a functional film comprising a substrate film provided with a thin-layer system, wherein the auxiliary film possesses no coating or a coating differing from the thin-layer system of the substrate film.

6. Laminated glass pane in accordance with claim 1, wherein the substrate film and the auxiliary film consist of the same material.

7. Laminated glass pane in accordance with claim 1, wherein there is an area at least partially overlapping the recess, with reduced light transmission.

* * * * *